April 2, 1963 O. VIERLING ETAL 3,083,897

CODING DEVICE

Filed Aug. 7, 1959 8 Sheets-Sheet 1

April 2, 1963 O. VIERLING ETAL 3,083,897

CODING DEVICE

Filed Aug. 7, 1959 8 Sheets-Sheet 2

April 2, 1963 — O. VIERLING ETAL — 3,083,897

CODING DEVICE

Filed Aug. 7, 1959 — 8 Sheets-Sheet 3

April 2, 1963 | O. VIERLING ETAL | 3,083,897

CODING DEVICE

Filed Aug. 7, 1959 | 8 Sheets-Sheet 4

April 2, 1963 O. VIERLING ETAL 3,083,897

CODING DEVICE

Filed Aug. 7, 1959 8 Sheets-Sheet 5

April 2, 1963

O. VIERLING ETAL 3,083,897

CODING DEVICE

Filed Aug. 7, 1959

8 Sheets-Sheet 6

April 2, 1963 O. VIERLING ET AL 3,083,897

CODING DEVICE

Filed Aug. 7, 1959 8 Sheets-Sheet 7

April 2, 1963 O. VIERLING ETAL 3,083,897

CODING DEVICE

Filed Aug. 7, 1959

8 Sheets-Sheet 8

3,083,897

CODING DEVICE

Oskar Vierling and Wolfgang Peuser, Ebermannstadt, and Rudolf Röseler and Otto Schulz, Darmstadt, Germany; said Peuser, Röseler, and Schulz assignors to said Vierling Filed Aug. 7, 1959, Ser. No. 832,246
Claims priority, application Germany Aug. 9, 1958
14 Claims. (Cl. 234—5)

This invention relates to apparatus for coding information by using a binary code, particularly a numerical addition and substraction device, and an indicating device connected therewith.

The coding, that is, the conversion or transformation of information into code-signal combinations of a binary code, makes it possible to transmit these combinations telegraphically, in the form of electrical impulse sequences, and/or to store them in bands, such as perforated strips or magnetic tapes, for the purpose of afterwards employing these bands or strips for the high-speed controlling of a transmitter, or of a typewriter or a type-setting machine.

These control bands or perforated strips must be produced in such a way that the signals or characters contained in a line are separated by control codings provided for this purpose from those of the next line, in order that the type-setting machine may be able to justify a line before it begins to set the next line. As is known, the matrices employed in setting machines are of different breadths, and the word spaces, which are formed by so-called space keys or quoins, vary in breadth between a minimum and a maximum value. Since for all lines a pre-adjustable length, which in general remains constant in a given text, is required, the signal content of a line, in the production of the control band or perforated strip, must be limited to a dimension which can be justified by means of the space keys or quoins available. An indicating device for the filling of the line must be put in position by the operative who is producing the control band or perforated strip, to end the line correctly with the end of a word or of a syllable.

Since, in the production of a perforated strip, the control over the filling of a line with respect to its justifiability cannot be effected directly on the matrices set, as in the case of the setting machine itself, the filling of the line must already be determined and rendered recognisable in the production of the perforated strip, to enable the code combination for the justification of the line to be punched in at the appropriate place, this code combination subsequently delivering to the type-setting machine the command to justify the assembled line of matrices, and pass it on for casting.

For the supervision of the filling of each line there must be provided, in the apparatus that produces the perforated strip, a suitable counting, adding and substracting device, to be actuated by striking the keys, for the numerical values corresponding to the breadths of the individual matrices. This counting, adding and substracting device must moreover be so constructed that it can be connected with an indicating device, which delivers a measure for the filling of a line, the length of which is adjustable to the particular value required.

This invention is based upon the problem of providing a coding device in which the binary coded numerical value corresponding to the various matrix breadths is supplied to a binary counter, the counting, adding and substracting device of which is so constructed that it can be used for controlling an indicating device which furnishes a measure for the filling of the line to be set, for instance by means of a displaceable screen. The counter is furthermore to be pre-adjustable to different line length or formats.

According to the invention this problem is solved substantially by means of a device for the coding of written matter and for checking the lengths of lines for the production of storage bands, particularly perforated strips for the control of Linotype composing machines, by the feature that each key of a setting keyboard actuates one or more contacts, and that the contacts are connected with the input conductors of a counting magazine, the output conductors of which are connected with a coding device, which, with the interposition at times of an anti-impact step (brief-time storage) for each output conductor of the coding device with an electrical or electronic binary counter, which is coupled to an optical indicating device, which indicates the state of the counter with a predetermined degree of accuracy, and that the electrical or electronic binary counter is connected with an adjusting device, with which the electrical or electronic binary counter is adjustable to an initial value which can be selected to correspond to the line breadth to be written, and that furthermore a device to be actuated at will is provided before the counter, so that according to the position of the device, when a setting key is depressed, the numerical value of the breadth of the matrix key or space key or quoin corresponding thereto is added or substracted in the electrical or electronic binary counter.

The coding device according to the invention, as set forth, presents the great advantage of indicating separately, from time to time, the line filling by matrices and space-key minimum breadths in one indicating system, and of the line filling by the space-key differential breadths in the other indicating system, so that the typesetter can recognise at any time whether the line is so far filled that it can be justified by widening the breadth of the space keys. Furthermore it is possible, by the arrangement of the binary counter according to the invention, to effect the correction of a signal by substraction, not only in the perforated strip but also in the counter and in the indicating device.

Further advantages and features of the coding apparatus according to the invention will be gathered from the following description of a constructional example which is diagrammatically illustrated in the accompanying drawings, in which.

Figure 1:
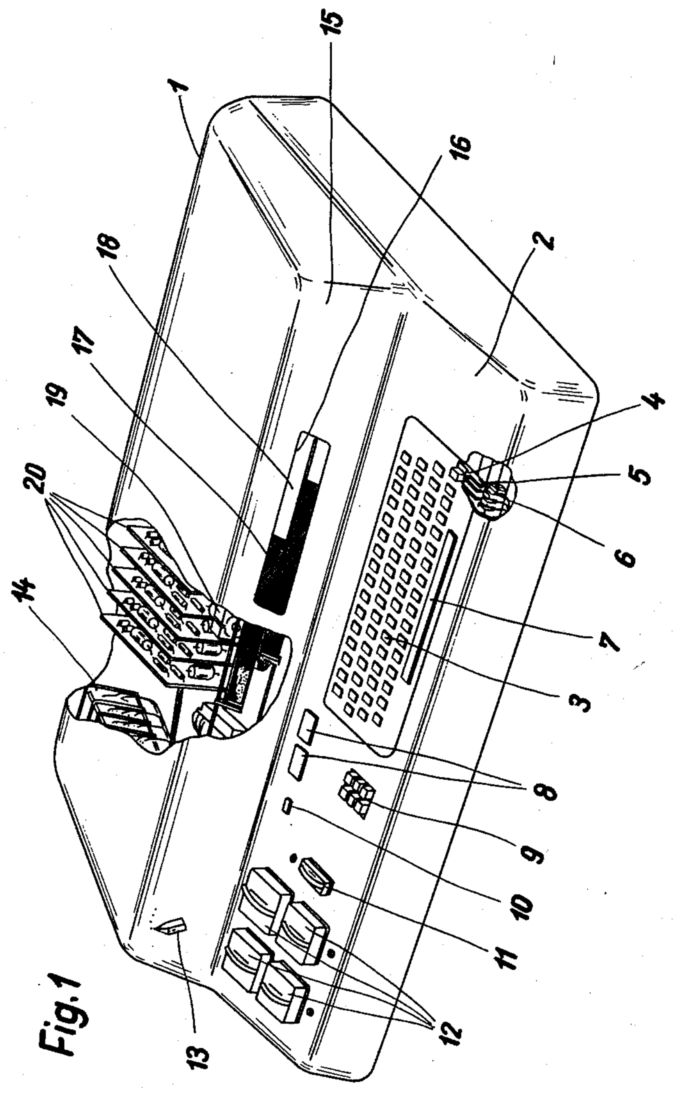
FIGURE 1 is a perspective view of a coding device according to the invention, which is provided with a keyboard similar to that of a known "perforator" for the production of perforated strips for high-speed typesetting machines, the casing of the apparatus being shown partly broken away so as to show the internal elements of the apparatus.

The apparatus illustrated in FIGURE 1 for the coding of clear-text compositions in binary codes may be used for the actuation of a perforating device, not shown, to be attached to this apparatus, in which, in a manner known in itself, by magnetically moved punching levers, combinations of holes are punched in a paper strip, which can then be employed in its turn either directly, or after telegraphic transmission of the punched code-signal combination, for controlling a high-speed type-setting machine.

The housing 1 of the coding device has a sloping surface 2 in which the controls of the device are arranged. In the right hand part of the surface there is the keyboard 3 which has $2^6$ or 64 keys such as are used with type setting machines. Each of the keys 4 of the keyboard when depressed causes a spring contact 5 which is connected with a source of direct current, to descend on to a fixed contact 6 below. A spacing key 7 is mounted at the front of the keyboard, which generates the code signal for spaces to be made by the type setting machine. The keyboard is further provided for the printing of enlarged letters at the beginning of the chapters, and for the changing of the type.

The keyboard 3 can form part of a complete electric typewriter which writes down the uncoded text to be read.

To the left of the keyboard at the back of the sloping surface 2 there are two lamps 8 one of which shines when the key for the printing of enlarged letters, or the key for changing the type face, is depressed.

Below the two lamps 8 there are six push-switches 9 for setting the line length.

Other controls whose position can easily be seen from the drawing are:

A main switch 10.

A plug socket 11 which forms the magazine of the work spaces in a system of switches for the control of line length.

Four socket plugs 12 which, also in the control system for line width, form type magazines.

A change-over push switch 13 for the switching round of the magazines.

The rear part of the housing contains the multiple magazine switch 14. In a steep surface 15 of the housing 1 two shutters 17 and 18 are mounted behind a window 16. The former is an optical line indicator, i.e. the sum width of the type set in the line, whilst the latter indicates the word space difference. The shutter 17 is driven by a motor 19, behind which the binary digits for electronic counters are arranged.

Also contained in the housing 1 there is a diode matrix.

Figure 2:
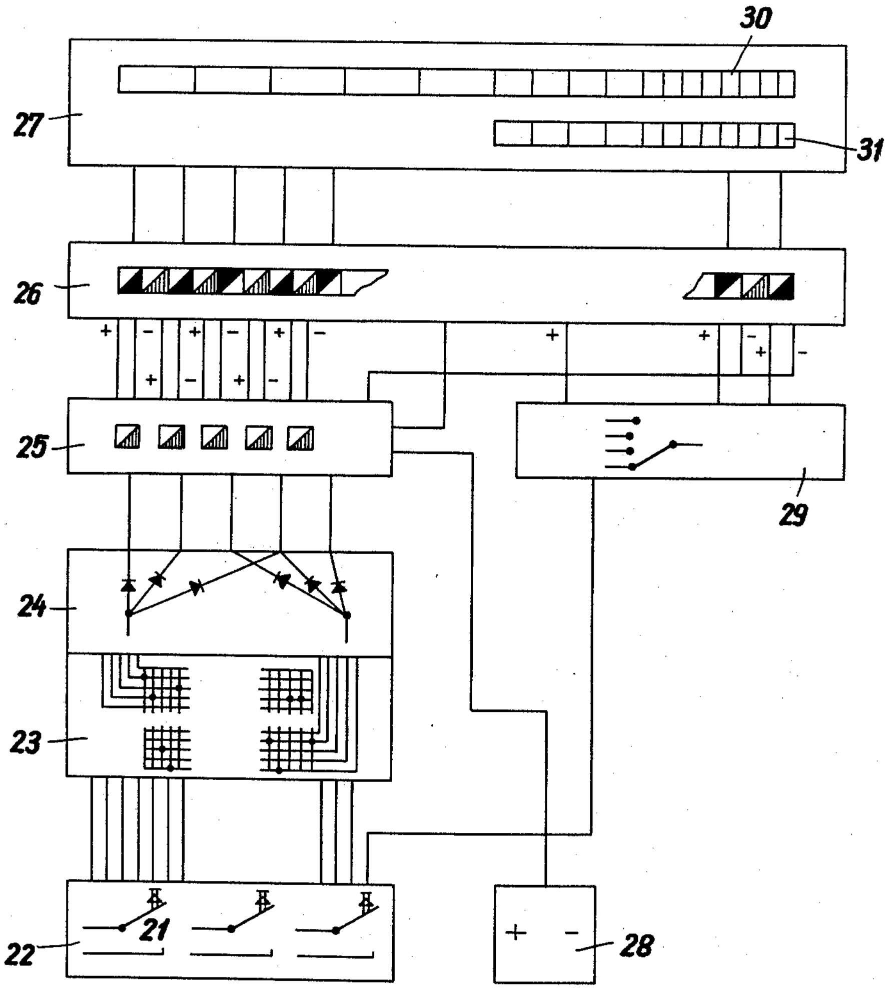
FIGURE 2 is a block diagram of an arrangement for the checking of the signals to be accommodated in a line of definite length.

The control device shown in FIGURE 2 is characterised in that the multiply connected key contacts 21 actuate a coding of the widths corresponding to the selected character with the help of a known diode circuit 24. The code is stored in a short period storage device 25 which according to the position of an add-or-subtract switch 28 supplies the circuit code or its complementary value to a binary counter 26 whose units are coupled to constant time members and provided with a known coincidence circuit which delivers signals for the filling of a line. By the use of binary counting there is a considerable economy in components. Naturally lines of different length must also be set, and, to this end, it is provided that at the end of each line the binary counter is preset to a value corresponding to the difference between the maximum and the desired line length. An embodiment of the invention, for this purpose, that is to say a control device for supervising the line filling, comprises two of the arrangements just described. One arrangement is for counting out the widths of the matrices to be printed and the minimum width of the word spaces, while the other arrangement serves to count out the differential between the minimum and maximum width of the word spaces. The register signals are so arranged that the differential between the two registrations is displaced with an adjustable degree of accuracy in a clear fashion. This is made possible by the digital counting system. In particular the indication is carried out so that two lighted strips 30 and 31, one above the other, are used. One of them is so operated that the process of matrix counting causes illuminated or dark bands becoming wider from left to right to be formed above, while below the breadth of luminosity or of darkness corresponding to the word space differential broadens out from right to left. As soon as the edges of the lighted areas are opposite each other, a line can be finished. The capacity as indicated by the bands should never be exceeded. The building up of the lighted bands from individual sheets of light according to the digital method so that no joins are visible is achieved by an embodiment of the invention shown in FIGURE 2. In this embodiment the bands of light 30 and 31 are produced from the light of incandescent lamps. The light is transmitted to the place from which it is to shine by means of a known transparent synthetic resin lead. The increase in accuracy towards the end of the line, which forms a particular advantage of the device, is achieved by the binary counter 26 giving more register signals as the value counted increases. In the feature of the invention, the bands lighted by the incandescent lamp become shorter towards the right-hand end of the lighted band.

The electronic device for counting widths of matrices permits the reckoning of the line filling for any imaginable sort of type. The evaluation of the width of a single letter depends on one of the soldered connections in a master circuit 23 which is attached so as to connect the keys up appropriately. This master circuit can be a printed circuit which corresponds to a given sort of type or it can incorporate a matrix of contacts in which punch cards can be inserted to correspond to the type used. As modern typesetting machines can set several sorts of type, the invention contemplates having the changeable and/or adjustable means for coding the matrix widths incorporated in the arrangement. The master circuits 23 can be made comparatively narrow. The plugs 12 of the cooling device of FIGURE 1 contain some which can be used for the different types to be used.

FIGURE 2 shows a block circuit diagram of the device. 22 indicates the keyboard of the coding device, such as that of an electric typewriter. The leads from the key contacts 21 pass to a changeable or adjustable master circuit 23 which gives each key its matrix width. Each lead passing from the master circuit 23 therefore corresponds to a different width of matrix. The matrix widths, thirty-two of which are shown here, are put into binary code signals by means of the diode dividing circuit 24. Since $32=2^5$, the diode dividing circuit has 5 exit leads. These lead to a short period storage device 25 which can comprise five monostable multivibrators. It serves to correct contact chatter which otherwise would cause the selected matrix to be counted several times. It moreover permits the coding to be transformed into a complementary value which is to be formed in relation to the binary counter 26. After defining the position of an adding and subtracting switch 28 either the regular terminals of the short period storage device 25 marked "+" become operative, or the terminals marked "−" for the complementary value. It is however also possible to effect the supplementary value-formation in another stage in particular, the coding device 28 is suitable for this. By this method a correction of an erroneous character is made possible if after the operation of the switch 28 the character is keyed again. At the same time, as with mechanical perforators, the synchronously produced tape is erased, that is to say the hole is covered so as not to influence the scanning devices.

The terminals of the short period storage device 25 of FIGURE 2 all lead to the binary counter 26. Since the latter receives five individual combinations of the width code at the same time, it is composed of bistable units which are coupled with constant time members. In the example, monostable multivibrators are provided which take up the transmission of each counting circuit until the direct information has been worked out. Rotary switches 29 are provided for adjusting the line length and by this means the binary counter 26 presets itself in response to the pressing of one of the end keys of the keyboard to a given value. As it is usually sufficient to adjust the line length only in whole squares of the written matter concerned, the group of switches 29 is preferably only connected to the position of the binary counter 26 corresponding to the higher position. The coincidence counter 27 which delivers signals for line filling, is connected with the binary counter. With an increasing registration of the binary counter the lamps of the upper light band light up bigger and bigger sections of the upper light band beginning from the left. In order that with lighting up of a section, the section lying ahead to the left of it may still be lit up, a corresponding by-passing of the coincidence counter is provided for.

The same applies for the lower word space band 31 except that its lighting up takes place from right to left, and the right hand sections remain lit up after the switching in of further sections. The control of the lower light band is moreover not shown as it corresponds to the control device of the upper band except in that it is simplified in some points.

The device as a whole is so designed that the electrical circuitry fills the housing.

Thus, transistors are valuable for economising in space. The diodes can advantageously be of the semi-conductor type for the same reason.

The register device can be improved, as already indicated, if a movable shutter 17 is used instead of a lighted band, the shutter being provided with a criterion for its position determination means. There should also be provided a device for comparing the position of the shutter and the matrix condition or word space counter respectively, which gives signals for the displacement of the shutter. Also there should be provided a drive device responding to the displacement signals of the shutter.

A criterion for the positioning of the shutter 17 can be reached in different ways. It is especially provided that the shutter comprises contact means which resemble a usual binary code or the Gray-code as the shutter is moved along. A particular binary number corresponds, therefore, to each position of the shutter. The binary number is generated by the making or breaking of contact between a shutter entrance pole and the exit terminals, which are provided in a number equal to the number of digits of the binary number.

The modified binary code known as Gray-code whose use particularly requires the presence of matrix width or word differential counter, is so constructed that two sequential binary numbers only differ in one binary digit. The going over from one particular shutter position to the neighbouring one therefore takes place with a minimum of switching operations.

Since with contact paths which are sensed by mechanical contacts, the condition of the contact paths alters with the wear in the contacts, it has been found advantageous to couple on a further shutter system which generates a binary or Gray code and is sensed by photoelectric elements. This shutter system comprises, for example, opaque shutter elements in the positions corresponding to those positions in mechanical systems where no contact should be made.

The position of the shutter and the condition of the counter each supply a binary number. It is the purpose of the register device according to the invention to adjust the shutter so that these binary numbers agree. It is clear that it is only necessary to generate the differential between the binary numbers and according to the sign of the difference to provide for an adjustment to move the shutter in one or the other direction. The differential can be determined with known digital subtraction devices.

Analogue calculators can also be used if accurate enough. But since the use of analogue devices is cheaper, it is logical to use more analogue subtracting devices which are coupled to coincidence circuits. With the division of the counting process into two analogue subtraction devices, there can be achieved a collation of the high-value counter and shutter digits with the aid of the first analogue subtractor and then a precise collation with the aid of the second analogue subtractor for binary digits of low value. In the coincidence circuit a type of zero point suppressor device of the indicator can be incorporated. This device suppresses the influence of especially high numbers whose indication is superfluous.

A simple method of analogue subtraction can be carried out by comparing alternating voltages which are derived from the position of the shutter and the condition of the binary counter according to the binary code used. By this means the differential alternating voltage, amplified and preferably limited is led to a phase sensitive motor which is additionally fed from the alternating voltage source. It is however also possible for the analogue subtraction to be carried out by comparison of direct voltages and for differential voltages of differing polarity, after they have preferably been amplified, to be supplied to a polarity sensitive D.C. motor.

The use of complete analogue or digital subtractors is comparatively expensive. As only the sign of the differential is of importance, these devices give more than is required of them. A simplification is possible in that the device for comparing the position and condition of the count comprises as many evaluating elements as there are digits in the binary number. When a shutter condition does not correspond with that of the counter, the evaluating elements switch out all the binary digits of low value and give a signal corresponding to the difference arising from a polarity sensitive D.C. motor.

For a better understanding of the improved register device the FIGURES 3 to 7 are referred to, in which a mechanical contact set is assumed.

The longitudinally movable shutter 32 covers accordcording to its position more or less of the window 16 shown in FIGURE 1. The shutter is of insulating material on which contact material 33 is applied as shown in the drawing. Eight fixed spring contacts K0 to K7 each engage one of the paths of the contact path for binary code and the path of the common (entrance) contact K0. The seven contacts correspond to $2^7=128$ possible different positions of the shutter. Each of these shutter positions is characterised by a seven-digit binary number which is derived from arrangement of the contact metal on different contact paths. The shutter position of FIGURE 3 so given is the binary equivalent of 75 to 1,001,011.

Figure 3:
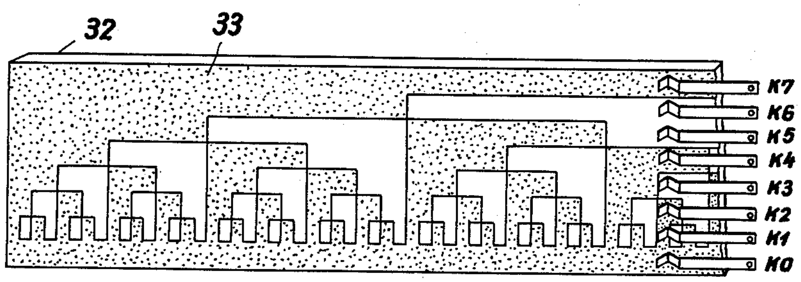
FIGURE 3 shows a screen provided with contact tracks according to the binary code, as used in the coding device of FIGURE 1 for checking the lengths of lines.
Figure 4:
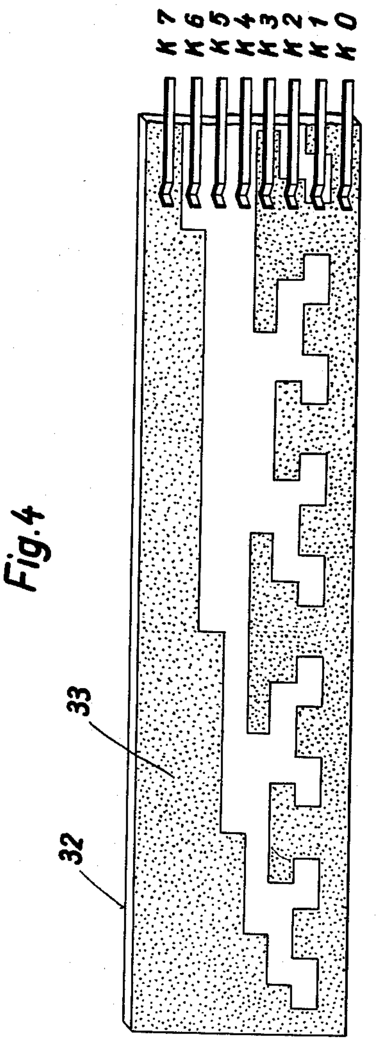
FIGURE 4 shows a screen provided with contact tracks according to the Gray code.

The screen 32 shown in FIGURE 3 carries a binary code, which, as already mentioned, at the transition from one position on the screen to the succeeding position, can change by one or more binary numerals. This can be obviated if instead of the binary code a Gray code is employed, in which, when passing from one binary position to the adjacent binary position, the binary numeral changes by only one position each time. A screen provided for the use of the Gray code is illustrated in FIGURE 4. It is distinguished from the screen shown in FIGURE 3 merely by the differently arranged contact surfaces.

Figure 5:
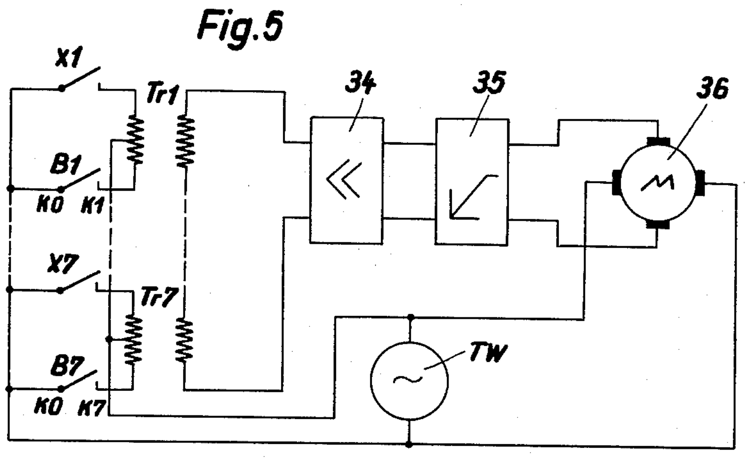
FIGURE 5 shows a circuit arrangement which is used in checking the line length, and effects an analogue subtraction by comparing alternating voltages.

In FIGURE 5 the contact means of the shutter 32 are shown as switches B1 and B7. The intermediately placed similar component groups are omitted for clarity. X1 and X7 designate contacts which repeat values of the first and seventh digits of the seven-digit binary number stored in the counter. The contacts X1 to X7 can be contacts of relays which are controlled by a counter channel device 26 according to FIGURE 2. They could also be electronic switches, for instance transistors which are subtracted or blocked by the electronic counter. The contacts X1 and B1 are so connected with a differential transformer Tr1 that a voltage arises in the secondary of the latter if only one of the contacts is closed. The phase position of the alternating current thus arising in relation to the voltage source depends on which contact is closed. The windings of the transformers Tr1, Tr2 and Tr3 are such that should all the X contacts be closed the alternating potentials generated by the secondary windings will be in the ratio of 1:2:4 . . . 64. As can be easily seen alternating current arises at exit windings in series. This current corresponds to the position of the shutter 32 and the condition of the counter as expressed in binary numbers. That current is led to an amplifier 34 coupled to a limiter 35. The latter serves to supply to the motor 36 a constant alternating voltage independently of the magnitude of the voltage differential. The motor thereby receives enough energy to adjust the shutter 32 quickly. The motor also receives alternating voltage direct from the generator TW. A phase-sensitive motor is used.

Figure 7:
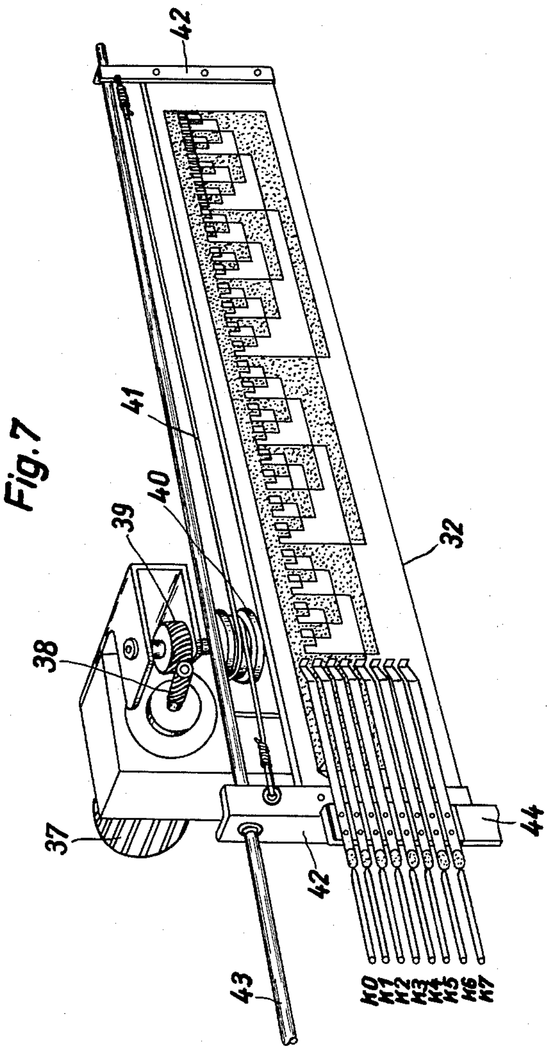
FIGURE 7 is an illustration of the movement mechanism for the screens shown in FIGURES 3 and 4.

From FIGURE 7 it can be seen how the driving motor 37 drives a worm 38 on its shaft to drive the worm-wheel 39 which is journalled in part of the motor mounting and carries a sheave 40 for a wire 41. The ends of the latter are severally secured to two angle girders 42 which are themselves rigidly fixed together and encompass a guide rod 43. The shutter and the angle girders 42 can be moved to the right or to the left when the motor is energised.

The eight contacts numbered sequentially K0 to K7 are separately mounted on a contact block 44 so that they contact the moving path.

Figure 8:
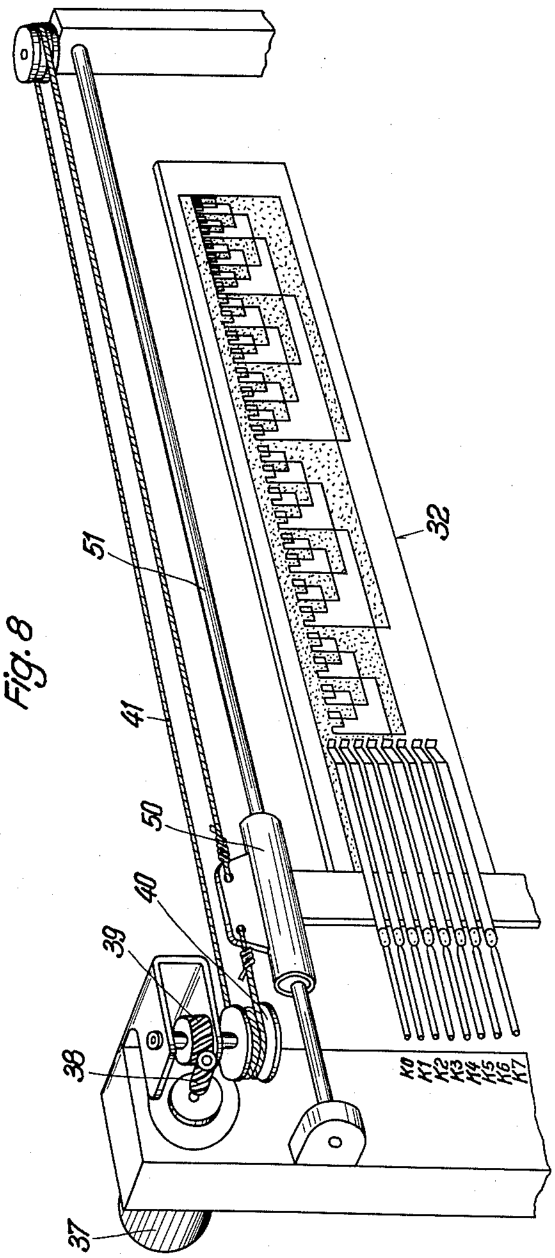
FIGURE 8 is an illustration of the movement mechanism with stationary screens according to FIGURES 3 and 4.
Figure 9:
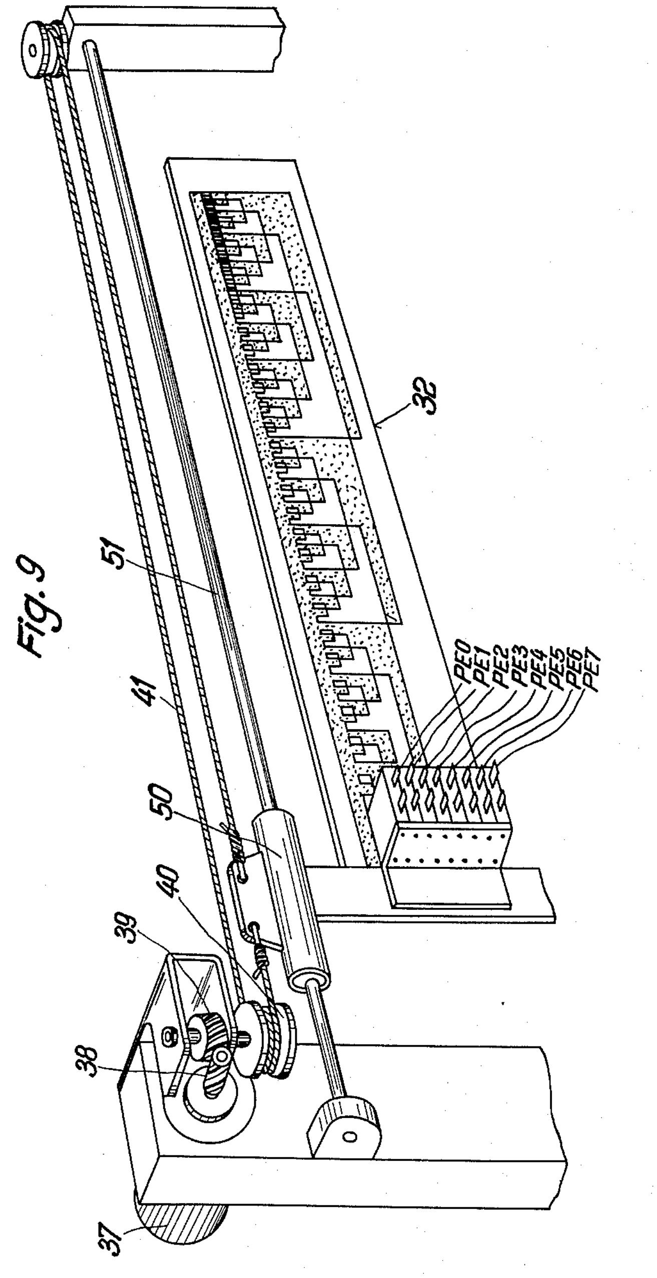
FIGURE 9 is an illustration of the movement mechanism with stationary screens and with key-operation by means of photo-electric cells.

FIGURES 8 and 9 illustrate how the driving motor 37, through the medium of the worm 38 mounted upon its shaft, drives the worm wheel 39, which is journalled in a part of the motor mounting, and carries upon its shaft a grooved cord pulley 40. Around this pulley passes a cord 41, the ends of which are secured to the guiding member 50, and displace the latter along a guiding rod 51. To the guiding member 50 are secured the contact springs K0 to K7, which are accordingly displaceable relatively to the stationary code screen 32. With a photoelectric key-operating of the code screen 32, photo-electric cells PE0 to PE7, rigidly connected with the displaceable guiding member 50, are displaced along the guiding rod 51 over the stationary code screen.

Figure 10:
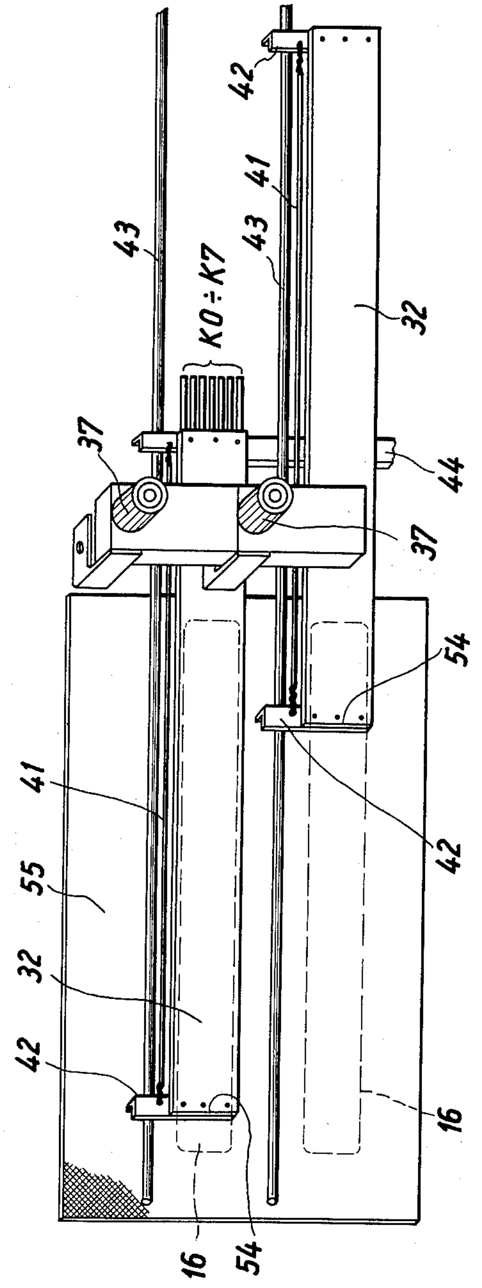
FIGURE 10 shows the movement mechanism with oppositely slidable screens.

As shown in FIGURE 10, the optical indicating device connected with the electronic binary counter, and indicating the counter condition with a predetermined degree of accuracy, consists of two parallel and longitudinally slidable screens 32, each of which covers, according to its position, a larger or smaller portion of a window 16, shown in FIGURE 1. This indicating device is based on the mechanism illustrated in FIGURE 7. The two screens 32 are slidable along guide rods 43, and are displaced, independently of one another, by means of wires or cables 41, sheaves not visible in FIGURE 10, and driving motors 37. By the edges 54 of the screens 32 moving in front of the windows 16, against a rising background 55, the line-filling by matrices and space-key minimum breadths is indicated in the upper window, and the line-filling by the space-key difference breadths is indicated in the lower window. By means of the contact springs K0 to K7, and corresponding contact springs concealed in FIGURE 10 by the lower screen, the positions of the screens are tapped off or measured according to the particular code on the back of the screens in FIGURES 3 and 4, so as to compare the particular screen position with the associated binary-counter position. Owing to the line-filling for matrices and space-key minimum breadths being indicated separately from the line-filling by the space-key difference breadths, the setter can ascertain in each case whether the line is so far filled that it can be justified by increasing the breadth of the space keys. This is the case when the indicating edges 54 of the two oppositely moving screens 32 exactly register with one another.

Figure 6:
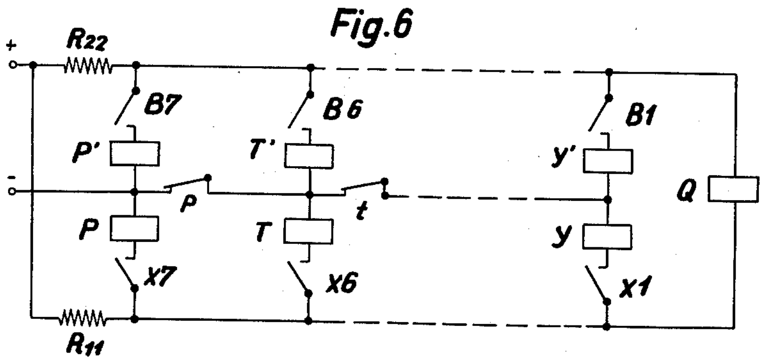
FIGURE 6 shows a circuit for the simplified difference formation in the checking of signal lengths.

A simpler arrangement for generating control signals for the motor from the shutter and counter is shown in FIGURE 6. Again the counter contacts are designated X1, X2, to X7, and the shutter contacts B1, B2 to B7. P and $P^1$ are two windings of an unpolarized relay which are so connected that current flowing through both of them will not operate the relay, the latter's contact *p* only being opened by a current in one winding. This clearly only happens when the highest binary digit from the counter and the shutter disagree. By the opening of contact *p* the low binary digits have no effect until the high-value position is connected by an appropriate movement of the shutter. A polarized signal for the movement of the shutter can be taken from the separate points on the resistances R11 and R22. This is indicated by the polarized relay Q, whose armature is in the intermediate rest position. It closes the one or the other of the contacts according to the strength of the impulse and is polarity. In this way the directional control of the motor is possible. If the highest binary digit is equalled, the contact *p* is closed. The equalization is now repeated for the low value binary digit designated 6, and so forth.

Certain variations are possible within the scope of the invention. Thus, for instance the relays P, T . . . and Y can be replaced by electronic switches.

We claim:

1. An electronic coding device for coding information and controlling the length of lines for the production of storage bands, particularly of punched strips for controlling type-setting machines, comprising: a setting keyboard for setting matrix quoins and space quoins of different breadths, contacts actuated by the individual keys of the setting keyboard, a counting magazine, input conductors leading from the said contacts to the counting magazine, a coding device, output conductors leading from the counting magazine to the coding device, an electronic binary counter, conductors leading from the coding device to the binary counter, a short-period storage device interposed in each of the conductors leading from the coding device to the binary counter, an optical indicating device coupled to the binary counter to indicate the counter position with a predetermined degree of accuracy, a rotary adjusting switch for adjusting the binary counter to an initial value to be selected to correspond to the line breadth to be written, and an adding-and-subtracting switch to be actuated at will, to cause a numerical value corresponding to the breadth of a quoin corresponding to a key that has been depressed to be added or subtracted in the binary counter, a counting group including the binary counter and the adding-and-subtracting switch being employed for the summation of the breadths of the type characters to be printed and the minimum breadths of the spaces between the words in a line, and the electronic device also comprising a second similar counting group for the formation of the difference between the sum of the minimum breadths and the sum of the maximum breadths of all the spaces between the words in a line, and the optical indicating device rendering visible the indicated values of each of the counting groups.

2. An electronic coding device as claimed in claim 1, wherein the means for indicating the numerical value of each of the two counting groups comprise a straight scale and a pointer movable along the straight scale, the two scales being spaced apart but parallel to one another, and the two pointers moving in opposite directions.

3. An electronic coding device as claimed in claim 1, the said indicating means comprising: a light-reflecting luminous band, a number of glow lamps, and conductors connecting the glow lamps individually with associated regions of the luminous band.

4. An electronic coding device as claimed in claim 3, wherein the regions of the luminous band associated with the individual glow lamps become progressively smaller towards the right-hand end of the band.

5. An electronic coding device for coding information and controlling the length of lines for the production of storage bands, particularly of punched strips for controlling type-setting machines, comprising: a setting keyboard for setting matrix quoins and space quoins of different breadths, contacts actuated by the individual keys of the setting keyboard, a counting magazine, input conductors leading from the said contacts to the counting magazine, a coding device, output conductors leading from the counting magazine to the coding device, an electronic binary counter, conductors leading from the coding device to the binary counter, a short-period storage device interposed in each of the conductors leading from the coding device to the binary counter, an optical indicating device coupled to the binary counter to indicate the counter position with a predetermined degree of accuracy, a rotary adjusting switch for adjusting the binary counter to an initial value to be selected to correspond to the line breadth to be written, an adding-and-subtracting switch to be actuated at will, to cause a numerical value corresponding to the breadth of a quoin corresponding to a key that has been depressed to be added or subtracted in the binary counter, a movable screen for indicating the numerical value of a counting group including the binary counter and the adding-and-subtracting switch, driving means for moving the screen, tracks extending along the screen in the direction of its motion, spaced apart and parallel to one another, signalling devices arranged along the said tracks, detectors co-operating with the said signalling devices to emit a signal when adjacent thereto, the signalling devices arranged along the tracks being distributed over the screen in such a way that to different discrete screen positions there corresponds at any time a different combination of excited detectors, and means for comparing the position of the screen with the position of the counting group, and thereby transmitting signals to the driving means for the screen whenever the position of the counting group does not correspond to the position of the screen.

6. An electronic coding device as claimed in claim 5, wherein the tracks on the screen are contact tracks simulating a binary code.

7. An electronic coding device as claimed in claim 5, further comprising a system of additional screens, simulating a binary code, and capable of being scanned by photoelectric means.

8. An electronic coding device as claimed in claim 5, wherein the means for comparing the position of the screen with the position of the counting group is a digital subtraction device.

9. An electronic coding device as claimed in claim 5, wherein the means for comparing the position of the screen with the position of the counting group comprise at least one subtraction device operating by the analogue method.

10. An electronic coding device as claimed in claim 9, the driving means for moving the screen being a phase-sensitive electric motor, and the electronic coding device further comprising: means for supplying alternating current directly to the said motor from a source of supply, means for effecting the analogue subtraction by comparing co-phasal alternating voltages the amplitudes of which correspond, according to the binary code adopted, to the position of the screen and to the state of the counter, means for amplifying and preferably limiting the differential alternating voltage, and means for supplying the amplified differential alternating voltage to the phase-sensitive motor.

11. An electronic coding device as claimed in claim 9, the driving means for moving the screen being a continuous-current motor the direction of rotation of which depends upon the polarity of the voltage, and the electronic coding device further comprising: means for effecting the analogue subtraction by comparing continuous voltages the magnitude of which from time to time depends upon the position of the screen and upon the state of the counter according to the binary coding, means for amplifying the differential voltage, and means for supplying the amplified differential voltage to the continuous-current motor.

12. An electronic coding device as claimed in claim 5, wherein the means for comparing the position of the screen with the position of the counting group comprise coincidence circuits, and a plurality of subtraction devices coupled to the coincidence circuits and operating by the analogue method.

13. An electronic coding device as claimed in claim 5, with binary coded contact means, wherein the means for comparing the position of the screen with the position of the counting group comprise: a continuous-current motor the direction of rotation of which depends upon the polarity of the voltage, and a number of evaluating members corresponding to the number of binary positions, the evaluating members being adapted, upon inequality of the binary numerals associated with the state of the screen and those associated with the state of the counter, to switch off all the evaluating members corresponding to lower-grade binary positions, and to supply to the continuous-current motor a continuous voltage corresponding to the polarity of the differential voltage.

14. An electronic coding device for coding information and controlling the length of lines for the production of storage bands, particularly of punched strips for controlling type-setting machines, comprising: a setting keyboard for setting matrix quoins of the type characters and space quoins, contacts actuated by the individual keys of the setting keyboard, a counting magazine, input conductors leading from the said contacts to the counting magazine, a coding device for giving each key its corresponding matrix breadth, output conductors leading from the counting magazine to the coding device, two electronic binary counters, conductors leading from the coding device to the binary counters, an electronic short-period storage device interposed in each of the conductors leading from the coding device to the binary counters, one of the said binary counters being employed for the summation of the breadths of the matrix quoins of the type characters to be printed and the minimum breadths of the space quoins between the words in a line, and the other electronic binary counter being employed for the formation of the difference between the sum of the minimum breadths and the sum of the maximum breadths of all the spaces between the words in a line, an optical indicating device coupled to the binary counters to indicate the counter position of each of the binary counters with a predetermined degree of accuracy, the said optical indicating device comprising two straight optically indicating bands, and pointing means movable along each straight band, these two optically indicating bands being spaced apart but parallel to one another, and the two pointing means moving in opposite directions, a rotary adjusting switch for adjusting one of the binary counters to an initial value to be selected to correspond to the line breadth to be written, and an adding-and-subtracting switch to be actuated at will, to cause a numerical value corresponding to the breadth of a quoin corresponding to a key that has been depressed to be added or subtracted in the binary counter.

References Cited in the file of this patent

UNITED STATES PATENTS 2,848,049 Robbins et al. ____________ Aug. 19, 1958